(12) United States Patent
Laitinen et al.

(10) Patent No.: US 7,639,641 B2
(45) Date of Patent: Dec. 29, 2009

(54) METHOD AND APPARATUS PROVIDING PERFORMANCE IMPROVEMENT FOR GPRS NEIGHBOUR CELL MEASUREMENT REPORTING WHEN PACKET BROADCAST CONTROL CHANNEL IS NOT AVAILABLE

(75) Inventors: Pasi Laitinen, Oulu (FI); Hannu Huusko, Oulu (FI); Antti O. Kangas, Oulu (FI)

(73) Assignee: Nokia Corporation, Espoo (FI)

( * ) Notice: Subject to any disclaimer, the term of this patent is extended or adjusted under 35 U.S.C. 154(b) by 1147 days.

(21) Appl. No.: 10/687,011

(22) Filed: Oct. 16, 2003

(65) Prior Publication Data

US 2005/0085232 A1    Apr. 21, 2005

(51) Int. Cl.
*H04W 4/00*    (2009.01)

(52) U.S. Cl. ................... 370/328; 370/329; 455/435.2; 455/450; 455/452.1

(58) Field of Classification Search .......... 455/436, 455/437, 438, 439, 67.11, 67.13, 226.1, 226.2, 455/226.3, 435.2, 450, 452.1; 370/331, 332, 370/328, 329
See application file for complete search history.

(56) References Cited

U.S. PATENT DOCUMENTS

| | | | | |
|---|---|---|---|---|
| 5,966,657 | A | 10/1999 | Sporre | 455/425 |
| 6,765,891 | B2 * | 7/2004 | Laitinen et al. | 370/331 |
| 2002/0176409 | A1 | 11/2002 | Kivijarvi et al. | 370/352 |
| 2003/0189912 | A1 | 10/2003 | Laitinen et al. | 370/338 |
| 2004/0184423 | A1 | 9/2004 | Tiedmann, Jr. et al. | 370/331 |
| 2005/0037758 | A1 | 2/2005 | Rimoni | 455/436 |
| 2005/0048974 | A1 | 3/2005 | Kim et al. | 455/436 |

FOREIGN PATENT DOCUMENTS

WO    WO 03/084095 A1    10/2003

OTHER PUBLICATIONS

3 GPP TS 04.60, Section 5.6.3.2, "Deriving BA (GPRS) and the GSM Neighbour Cell list", V8.19.0 (Jul. 2003), 1 pg.
3 GPP TS 44.060, Section 11.2.9, "Packet Measurement Report", V6.1.0 (Feb. 2003), pp. 172-193.
ETSI TS 101 349, V8.20.0, "Digital cellular telecommunications system (Phase 2+); General Packet Radio Service (GPRS); Mobile Station (MS)—Base Station System (BSS) interface; Radio Link Control/Medium Access Control (RLC/MAC) protocol", (3GPP TS 04.60 version 8.20.0 Release 1999), Sep. 1, 1993, paragraphs 5.6.1-5.6.3; paragraphs 11.2.9 and 11.2.17-11.2.25b.

(Continued)

*Primary Examiner*—Temica M Beamer
(74) *Attorney, Agent, or Firm*—Harrington & Smith, PC (57) ABSTRACT

A method operates, in at least one network control mode of operation (preferably NC2), for determining in a MS if a cell to which the MS is currently assigned has a first type of broadcast control channel (the PBCCH) and, if the cell does have the first type of broadcast control channel, for sending a PACKET MEASUREMENT REPORT message to the network for reporting on neighbour cells identified in a list received from the PBCCH. If the cell does not have the PBCCH, the method instead sends a PACKET MEASUREMENT REPORT message to the network for reporting on neighbour cells identified in a list received from a second type of broadcast control channel (BCCH). The type of list used by the MS is one of implicitly specified by the PACKET MEASUREMENT REPORT message, or is explicitly specified by the PACKET MEASUREMENT REPORT message.

32 Claims, 2 Drawing Sheets

OTHER PUBLICATIONS

ETSI TS 100 911, V8.18.0, "Digital cellular telecommunications systems (Phase 2+); Radio subsystem link control", (3GPP TS 05.08 version 8.18.0 Release 1999), Aug. 1, 2003, paragraphs 6.6, 8.4 and 10.1.14-10.1.14.

ETSI TS 101 503, "Digital cellular telecommunications system (Phase 2+); Mobile radio interface layer 3 specification; Radio Resource Control (RRC) protocol", (3GPP TS 04.18 version 8.19.0 Release 1999), Jul. 1, 2003; paragraphs 3.4.1.2.

* cited by examiner

METHOD AND APPARATUS PROVIDING PERFORMANCE IMPROVEMENT FOR GPRS NEIGHBOUR CELL MEASUREMENT REPORTING WHEN PACKET BROADCAST CONTROL CHANNEL IS NOT AVAILABLE

TECHNICAL FIELD

This invention relates generally to wireless communications systems and methods and, more specifically, relates to the operation of a mobile station, such as a cellular telephone, with a network that supports general packet radio service (GPRS) operation and cell re-selection (CRS) and measurement reporting functions.

BACKGROUND

The following additional abbreviations are herewith defined:

| | |
|---|---|
| 3G | Third Generation (cellular system) |
| 3GPP | Third Generation Partnership Project |
| BA | BCCH Allocation |
| BCCH | Broadcast Control Channel |
| BSIC | Base Station Identity Code |
| BSC | Base Station Controller |
| BSS | Base Station System |
| BTS | Base Transceiver Station |
| CCCH | Common Control Channel |
| DSP | Digital Signal Processor |
| GSM | Global System for Mobile Communications |
| IP | Internet Protocol |
| MCU | Micro-Control Unit |
| MS | Mobile Station |
| NC | Network Control |
| PACCH | Packet Associated Control Channel |
| PBCCH | Packet Broadcast Control Channel |
| PSI | Packet System Information |
| UMTS | Universal Mobile Telecommunications System |

Reference can also be made, for example, to 3GPP TR 21.905, V4.4.0 (2001-10), Third Generation Partnership Project; Technical Specification Group Services and System Aspects; Vocabulary for 3GPP Specifications (Release 4).

When attached to a GPRS service, the MS can operate in one of the three NC modes, NC0, NC1 or NC2. The network controls the NC mode of the MS via information sent to the MS in broadcast or point-to-point messages.

In the NC0 mode the MS is responsible for selecting the best cell to camp on by performing CRS. In this mode the MS is not required to report the characteristics (received signal quality, etc.) of the surrounding cells to the network. In the NC2 mode the MS does not perform CRS independently, but instead it reports the characteristics of the surrounding cells to the network with a PACKET MEASUREMENT REPORT message. The network can, according to the measurement reports sent by the MS, command the MS to change cells. In the NC1 mode the MS performs both CRS and the measurement reporting.

In 3GPP Release 1999 (R99) the measurement reporting of surrounding 2G cells in the NC1 and NC2 modes is based on the GSM Neighbour Cell list. On the CCCH, the GSM Neighbour Cell list is constructed from the BA(list) (frequency list) broadcast in System Information 2/2bis/2ter messages, and from the BSIC list that is broadcast in the System Information Type 2quater message. However, if the BSIC list is not broadcast in the cell, the GSM Neighbour Cell list is defined to be equal to the BA(list) from the System Information Type 2/2bis/2ter messages. For GPRS neighbour cell measurement reporting, the BA(list) from the System Information Type 2/2bis/2ter messages is referred to as BA(GPRS).

When camping on a cell, the MS must acquire the GSM Neighbour Cell list from the system information before it can begin measurement reporting. The System Information 2quater message contains several message instances, and thus receiving the entire message takes some significant amount of time (up to tens of seconds, depending on the network configuration).

When the MS is moving rapidly the need to change cells occurs quite often, for example once every 15 seconds. However, when in the NC2 mode the network is unable to command the MS to change the cell until the MS has sent measurement reports, because without measurement reports the network does not know to which cell the MS should be assigned. Further, the MS must receive all instances of the System Information Type 2quater message before it is able to construct the GSM Neighbour Cell list. Thus, measurement reporting by the MS can begin only after the reception of the entire SI2quater message. However, the amount of time required to receive the SI2quater message is often so long that it is already too late to change the cell. As a result, the MS can drop out of service when moving outside the service area of the current cell. In practice, this situation is likely to occur, for example, on a highway in an area where the size of the cells is small.

The network could be configured not to use the System Information Type 2quater message, resulting in the GSM Neighbour Cell list being equal to the BA(GPRS) from the System Information Type 2/2bis/2ter messages, as described above. However, several procedures, e.g. GSM-UMTS interworking, require the presence of this message. Thus, eliminating the use of the System Information Type 2quater message is not an acceptable solution from a network configuration perspective.

Prior to this invention, there was no satisfactory solution to the problem described above.

SUMMARY OF THE PREFERRED EMBODIMENTS

The foregoing and other problems are overcome, and other advantages are realized, in accordance with the presently preferred embodiments of these teachings.

In one aspect this invention provides a method that operates, in at least one network control mode of operation (preferably NC2), for determining in the MS if a cell to which the MS is currently assigned has a first type of broadcast control channel (the PBCCH) and, if the cell does have the first type of broadcast control channel, the method sends a PACKET MEASUREMENT REPORT message to the network for reporting on neighbour cells identified in a list received from the PBCCH. If the cell does not have the PBCCH, the method instead sends a PACKET MEASUREMENT REPORT message to the network for reporting on neighbour cells identified in a list received from a second type of broadcast control channel (BCCH). The type of list used by the MS is one of implicitly specified by the PACKET MEASUREMENT REPORT message (embodiment 1), or is explicitly specified by the PACKET MEASUREMENT REPORT message (embodiment 2).

The list is preferably implicitly specified by sending the message in an earlier version that by default implies the type of list. For example, the PACKET MEASUREMENT REPORT message is sent in a GPRS Release 1997 format that implies a BA(GPRS) from the Broadcast Control Channel (BCCH).

The list is preferably explicitly specified by a field of the PACKET MEASUREMENT REPORT message, such as a one bit field for specifying that the PACKET MEASUREMENT REPORT is based on a BA(GPRS) from the BCCH, or on a GSM Neighbour Cell list from the BCCH. The one bit field is added to the PACKET MEASUREMENT REPORT message only if the PBCCH is not present in the cell.

In further aspects of this invention a computer program product is embodied on a tangible computer-readable medium and includes program instructions for causing a computer of the MS to execute a method of operating with a network, as summarized above.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
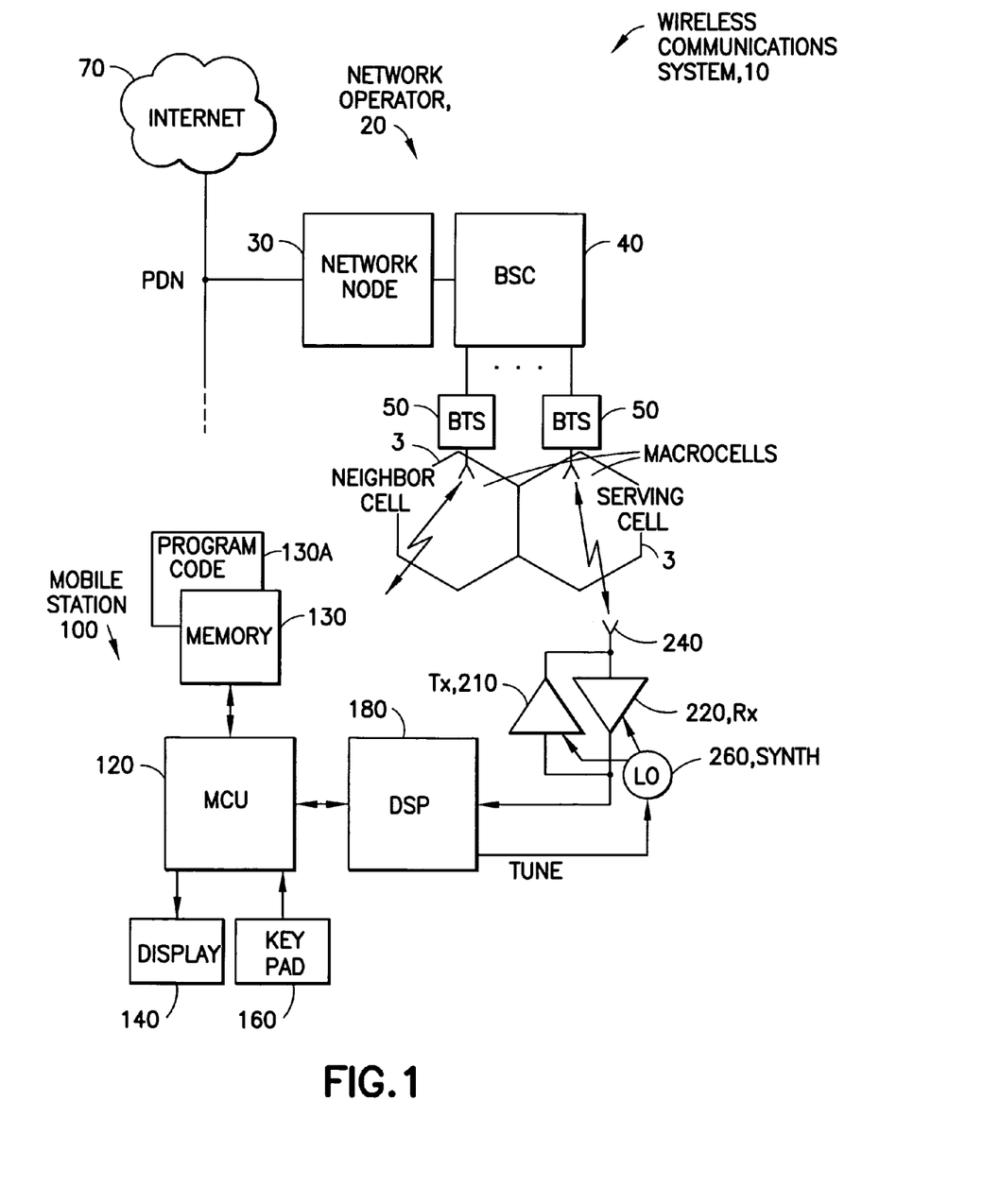
FIG. 1 is a block diagram of a wireless communications system that includes a mobile station and a network operator, and that is suitable for use in practicing this invention.

By way of introduction, and referring to FIG. 1, there is shown as a simplified block diagram an embodiment of a wireless communications system 10 that is suitable for practicing this invention. The wireless communications system 10 includes at least one MS 100. FIG. 1 also shows an exemplary network operator 20 having, for example, a node 30 for connecting to a telecommunications network, such as a Public Packet Data Network or PDN, at least one BSC 40 or equivalent apparatus, and a plurality of BTSs 50, also referred to as base stations (BSs), that transmit in a forward or downlink direction both physical and logical channels to the MS 100 in accordance with a predetermined air interface standard. A reverse or uplink communication path also exists from the MS 100 to the network operator 20, which conveys mobile originated access requests and traffic. A (macro) cell 3 is associated with each BTS 50, where one cell will at any given time be considered to be a serving cell, while an adjacent cell(s) will be considered to be a neighbour cell. Smaller cells (e.g., picocells) may also be available.

The air interface standard can conform to any suitable standard or protocol, and may enable both voice and data traffic, such as IP data traffic enabling Internet 70 access and web page downloads. In the presently preferred embodiment of this invention the air interface standard is compatible with 3GPP TSs, such as 3GPP TS 04.60 and others, and in at least one embodiment of this invention a modification to the 3GPP TS 04.60.

The MS 100 typically includes a control unit or control logic, such as a MCU 120 having an output coupled to an input of a display 140 and an input coupled to an output of a keyboard or keypad 160. The MS 100 may be a handheld radiotelephone, such as a cellular telephone or a personal communicator. The mobile station 100 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

The MCU 120 is assumed to include or be coupled to some type of a memory 130, including a non-volatile memory 130A for storing an operating program and other information, as well as a volatile memory for temporarily storing required data, scratchpad memory, received packet data, packet data to be transmitted, and the like. The operating program is assumed, for the purposes of this invention, to enable the MCU 120 to execute the software routines, layers and protocols required to implement the methods in accordance with this invention (as described in further detail below), as well as to provide a suitable user interface (UI), via display 140 and keypad 160, with a user. Although not shown, a microphone and speaker are typically provided for enabling the user to conduct voice calls in a conventional manner.

The MS 100 also contains a wireless section that includes a DSP 180, or equivalent high speed processor or logic, as well as a wireless transceiver that includes a transmitter 200 and a receiver 220, both of which are coupled to an antenna 240 for communication with the network operator. At least one local oscillator, such as a frequency synthesizer (SYNTH) 260, is provided for tuning the transceiver. Data, such as digitized voice and packet data, is transmitted and received through the antenna 240.

Having thus described one suitable hardware platform for implementing this invention, a more detailed description of the operation of the MS 100 in cooperation with the network operator 20 will now be provided.

In order to decrease the amount of time required to begin measurement reporting by the MS 100, the measurement reporting is based on the GSM Neighbour Cell list only after the MS 100 has received the list, i.e., after it has received the System Information Type 2quater message. Before that time, the measurement reporting is instead based on the BA(GPRS) from the System Information Type 2/2bis/2ter messages. The MS 100 also indicates in each PACKET MEASUREMENT REPORT message which list the measurement report is based on.

This invention may be practiced using at last two embodiments. In a first embodiment, the MS 100 encodes PACKET MEASUREMENT REPORT messages as described in 3GPP R97 GSM standard, as long as the report is based on the BA(GPRS) from the System Information Type 2/2bis/2ter messages.

One significant advantage that is realized by the use of this embodiment is that changes are not required to be made to the air interface in the R99 standard. This is true because the PACKET MEASUREMENT REPORT messages in R97 always refer to the BA(GPRS) from the System Information Type 2/2bis/2ter messages. That is, a R99 compatible network must already understand the format of PACKET MEASUREMENT REPORT messages that are received from R97 compatible MSs.

At first glance it may appear that the use of this embodiment of the invention would prevent the MS 100 from reporting any information that is encoded in the R99 extension part of the PACKET MEASUREMENT REPORT message, as long as it sends PACKET MEASUREMENT REPORT messages encoded according to the R97 standard. However, there currently is no information specified for the MS 100 to encode in the R99 extension until it has acquired the full set of the System Information Type 2quater message. Thus, this apparent disadvantage would only impose a restriction on the PACKET MEASUREMENT REPORT extension in future releases (i.e., releases after R99). However, at present no such extensions have been defined, and a need for such extensions has not yet been identified.

In practice, the implementation of the first embodiment of this invention implies the existence of changes to the 3GPP R99 standard, more specifically to TS 04.60. More specifically still, changes are required to TS version 8.19.0, section 11.2.9 (Packet Measurement Report).

The PACKET MEASUREMENT REPORT message is defined to be sent on the PACCH from the MS 100 to the network 20 to report measurement results. The message may contain measurement results from the Network Control measurements or from Extended measurements, but not both simultaneously. More than one message may be required depending on the number of measurements to report. For a (3G) multi-RAT MS 100, a report on 3G cells may be included as a result of Network Control measurements. Table 11.2.9.1 defines the PACKET MEASUREMENT REPORT message content as follows:

Access Network; General Packet Radio Service (GPRS); Mobile Station (MS)-Base Station System (BSS) interface; Radio Link Control/Medium Access Control (RLC/MAC) protocol Release 6", Section 11.2.9, definition of NC Measurements at page 175.

The change to section 11.2.9 that is made in accordance with this embodiment of the invention is as follows:

"In a cell that has a PBCCH, the resulting frequency/cell list for NC Measurements is the GSM Neighbour Cell list, defined in sub-clause 5.6.3.2."

It is noted that the Packet Broadcast Control Channel (PBCCH) is defined for broadcasting packet data specific PSI (Packet System Information). If a PBCCH is not allocated, the packet data specific system information is broadcast instead on the BCCH (Broadcast Control Channel).

The change made in accordance with this embodiment of the invention further states that:

"In a cell that has no PBCCH, the resulting frequency/cell list for NC Measurements is the BA(GPRS) (defined in sub-

```
< Packet Measurement Report message content > ::=
    < TLLI : bit (32) >
    { 0 | 1 < PSI5_CHANGE_MARK : bit (2) > }
    { 0 < NC Measurement Report : < NC Measurement Report struct > >
    | 1 < EXT Measurement Report : < EXT Measurement Report struct > > }
    { null | 0 bit** = < no string >      -- Receiver compatible with earlier release
    | 1                                    -- Additions in Release 99 :
    { 0 | 1 { 0 < BA_USED : bit > < 3G_BA_USED : bit > | 1 < PSI3_CHANGE
_MARK : bit(2) > } < PMO_USED : bit > } { 0 | 1 < 3G Measurement Report : < 3G
Measurement Report struct > > }       < padding bits > } ;
< NC Measurement Report struct > ::=
    < NC_MODE : bit (1) >
    < RXLEV_SERVING_CELL : bit (6) >
    { 0 | 1 < INTERFERENCE_SERVING_CELL : bit (6) > }
    < NUMBER_OF_NC_MEASUREMENTS : bit (3) >
    {    < FREQUENCY_N : bit (6) >
        { 0 | 1 < BSIC_N : bit (6) > }
        <RXLEV_N:bit(6)> } * (val(NUMBER_OF_NC_MEASUREMENTS));
< EXT Measurement Report struct > ::=
    < EXT_REPORTING_TYPE: 00 | 01 | 10 >
    { 0 | 1
        { 0 | 1 < I_LEVEL_TN0 : bit (6) > }
        { 0 | 1 < I_LEVEL_TN1 : bit (6) > }
        { 0 | 1 < I_LEVEL_TN2 : bit (6) > }
        { 0 | 1 < I_LEVEL_TN3 : bit (6) > }
        { 0 | 1 < I_LEVEL_TN4 : bit (6) > }
        { 0 | 1 < I_LEVEL_TN5 : bit (6) > }
        { 0 | 1 < I_LEVEL_TN6 : bit (6) > }
        { 0 | 1 < I_LEVEL_TN7 : bit (6) > } }
    < NUMBER_OF_MEASUREMENTS : bit (5) >
    {    < FREQUENCY_N : bit (6) >
        { 0 | 1 < BSIC_N : bit (6) > }
        < RXLEV_N : bit (6) > } * (val(NUMBER_OF_MEASUREMENTS));
< 3G Measurement Report struct > ::=
    < N_3G: bit (3) >
    {    < 3G_CELL_LIST_INDEX : bit (7) >
        < REPORTING_QUANTITY : bit (6) > } * (val(N_3G + 1));
```

In the foregoing PACKET MEASUREMENT REPORT message content the information elements are all defined in TS version 8.19.0, section 11.2.9 (Packet Measurement Report).

Of most interest to this invention is the change made to the definition of the NC Measurements. The conventional definition of this field is simply as follows:

"The resulting frequency/cell list for NC Measurements is the GSM Neighbour Cell list, defined in clause 5.6.3.2".

Reference in this regard can be made, for example, to 3GPP TS 44.060, V6.1.0 (2003-02), "Third Generation Partnership Project; Technical Specification Group GSM/EDGE Radio clause 5.6.3.2) before the MS has acquired the GSM Neighbour Cell list from BCCH. After the MS 100 has acquired the GSM Neighbour Cell list from the BCCH, the resulting frequency/cell list for NC Measurements is the GSM Neighbour Cell list (defined in sub-clause 5.6.3.2)."

Further, the MS 100 is additionally specified to "not include the R99 extension ('additions in Release 99') in the PACKET MEASUREMENT REPORT message which refers to the BA(GPRS)."

The sub-clause 5.6.3.2 of 3GPP TS 04.60 V8.19.0 (2003-07), titled "Deriving BA(GPRS) and the GSM Neighbour Cell list", states the following.

In a cell without a PBCCH allocated, BA(GPRS) is equal to the BA (list) from the SI2/SI2bis/SI2ter messages. BSICs from the GPRS BSIC Description from one or more instances of the S12quater message (if broadcast) are associated with BA(GPRS) with the same BA_IND value to create the GSM Neighbour Cell list, as described in 3GPP TS 04.18 (sub-clause 3.4.1.2.1.2, "Deriving the GSM Neighbour Cell list from the BSIC and the BA (list)"). If the GPRS BSIC Description is not broadcast, the GSM Neighbour Cell list is equal to BA(GPRS) (only a frequency list).

In a cell with a PBCCH allocated, BA(GPRS) is derived from the neighbour cell parameters sent in PSI3 and ascending order of PSI3bis on PBCCH with the same PSI3_CHANGE_MARK value (see 11.2.20). Each neighbour cell listed in PSI3 and in one or more instances of PSI3bis is assigned an ascending index used for measurement reports. The first neighbour cell in PSI3 has the lowest index (=0), and the last neighbour cell in the highest indexed PSI3bis message has the highest index. The GSM Neighbour Cell list is equal to BA(GPRS).

Sub-clause 5.6.3.2 further states that the GSM Neighbour Cell list may contain up to 96 GSM Neighbour Cells. The total number of GSM frequencies to measure cannot exceed 32. If the list includes more than 32 frequencies, the MS 100 only measures the 32 frequencies with the lowest indices.

Sub-clause 5.6.3.2 further states that the GSM Neighbour Cell list may be modified by "NC Frequency List" in a PACKET CELL CHANGE ORDER message (in which case the reference list is given on the new cell) or one or more instances of the PACKET MEASUREMENT ORDER message with the same BA_IND value or PSI3_CHANGE_MARK value.

The "NC Frequency List" may add cells to the GSM Neighbour Cell list (see sub-clause 11.2.4 and 11.2.9b, "PACKET CELL CHANGE ORDER" and "PACKET MEASUREMENT ORDER"). These cells are defined to be added at the end of the GSM Neighbour Cell list and indexed in the order of occurrence within the PACKET CELL CHANGE ORDER message, or ascending instances of the PACKET MEASUREMENT ORDER message. The list of added cells may contain GPRS cell re-selection parameters. In case the same cell (ARFCN+BSIC) or the same ARFCN without BSIC occur more than once in the resulting GSM Neighbour Cell list, each occurrence is assigned an index, but only the cell with the highest index is used for cell re-selection and referred to in measurement reports.

Sub-clause 5.6.3.2 further states that the "NC Frequency List" may delete frequencies from the BA(GPRS) list (see 111.2.9b). The frequencies to be removed are identified by their indices in the BA(GPRS). In this case all cells associated with the removed frequencies are removed from the GSM Neighbour Cell list. Removed cells/frequencies keep their indices, but no measurements or reporting are performed. If the index points to a cell that does not exist, this is not considered as an error.

If the MS 100 receives a PACKET MEASUREMENT ORDER message (full set of instances) with a changed PMO_IND parameter value, any old "NC frequency list" is deleted. If the last PACKET MEASUREMENT ORDER message (full set of instances) does not contain a "NC frequency list" (no added or deleted frequencies) the MS 100 returns to BA(GPRS).

Sub-clause 5.6.3.2 states also that in a cell without a PBCCH allocated, if the BA_IND parameter is changed, the MS 100 operates to re-read and rebuild the GSM Neighbour Cell list. In a cell with a PBCCH allocated, and if PSI3_CHANGE_MARK is changed, the MS 100 operates to re-read and rebuild the GSM Neighbour Cell list.

In accordance with this first embodiment of the invention, it is noted that no changes are required to the structure of the PACKET MEASUREMENT REPORT message, as no additional information element or elements need be defined since the source of report is implicitly defined by the encoding the PACKET MEASUREMENT REPORT message. That is, by not including the R99 extension to the PACKET MEASUREMENT REPORT message (i.e., that part labeled 'Additions in Release 99'), the MS 100 essentially defaults to the PACKET MEASUREMENT REPORT message format (e.g., Release 1997) that is understood by the network 20 to imply the use of the BA(GPRS) from the BCCH. Only after having acquired the GSM Neighbour cell list from the BCCH does the MS 100 begin using the 'Additions in Release 99' portion of the PACKET MEASUREMENT REPORT message.

In the second embodiment of this invention a new field that explicitly indicates the referred list is added to the PACKET MEASUREMENT REPORT message. In the preferred embodiment the new field is a one bit field added to the 'Additions in Release 99' portion of the PACKET MEASUREMENT REPORT message, preferably just before the padding bits. The new field is preferably referred to as the NC_MEAS_LIST_TYPE, and is defined to indicate which list the NC Measurement report is based on, as follows:

0 The report is based on the BA(GPRS).

1 The report is based on the GSM Neighbour Cell list.

The MS 100 is defined to include the NC_MEAS_LIST_TYPE. field in the PACKET MEASUREMENT REPORT message only in a cell that has no PBCCH.

In this regard it is pointed out that the network 20 has knowledge of whether or not there is a PBCCH available in a cell, and can indicate the availability of the PBCCH to the MS 100 in the System Information Type 13 message that is broadcast on the BCCH.

The definition of NC Measurements is preferably also modified as in the first embodiment, i.e., to state in a cell that has a PBCCH, the resulting frequency/cell list for NC Measurements is the GSM Neighbour Cell list, as defined in sub-clause 5.6.3.2 (as set forth above). The change further states that in a cell that has no PBCCH, the resulting frequency/cell list for NC Measurements is the BA(GPRS) (defined in sub-clause 5.6.3.2) before the MS 100 has acquired the GSM Neighbour Cell list from BCCH. After the MS 100 has acquired the GSM Neighbour Cell list from the BCCH, the resulting frequency/cell list for NC Measurements is the GSM Neighbour Cell list (defined in sub-clause 5.6.3.2). However, this second embodiment does not place the same restriction on the use of the R99 extension in the PACKET MEASUREMENT REPORT message, as does the first embodiment.

An advantage of this embodiment is that the MS 100 is enabled to encode information in the R99 extension part of the PACKET MEASUREMENT REPORT message. While in a R99 compatible MS 100 this is not a direct benefit (as was discussed above), this second embodiment of the invention does not place any restrictions on the use of the PACKET MEASUREMENT REPORT message extension in future releases (releases after R99). However, this advantage is gained at the cost of requiring existing R99 networks to be revised to support this embodiment of the invention, since in this embodiment the source of the report is explicitly signaled by the state of the NC_MEAS_LIST_TYPE bit in the PACKET MEASUREMENT REPORT message.

Figure 2:
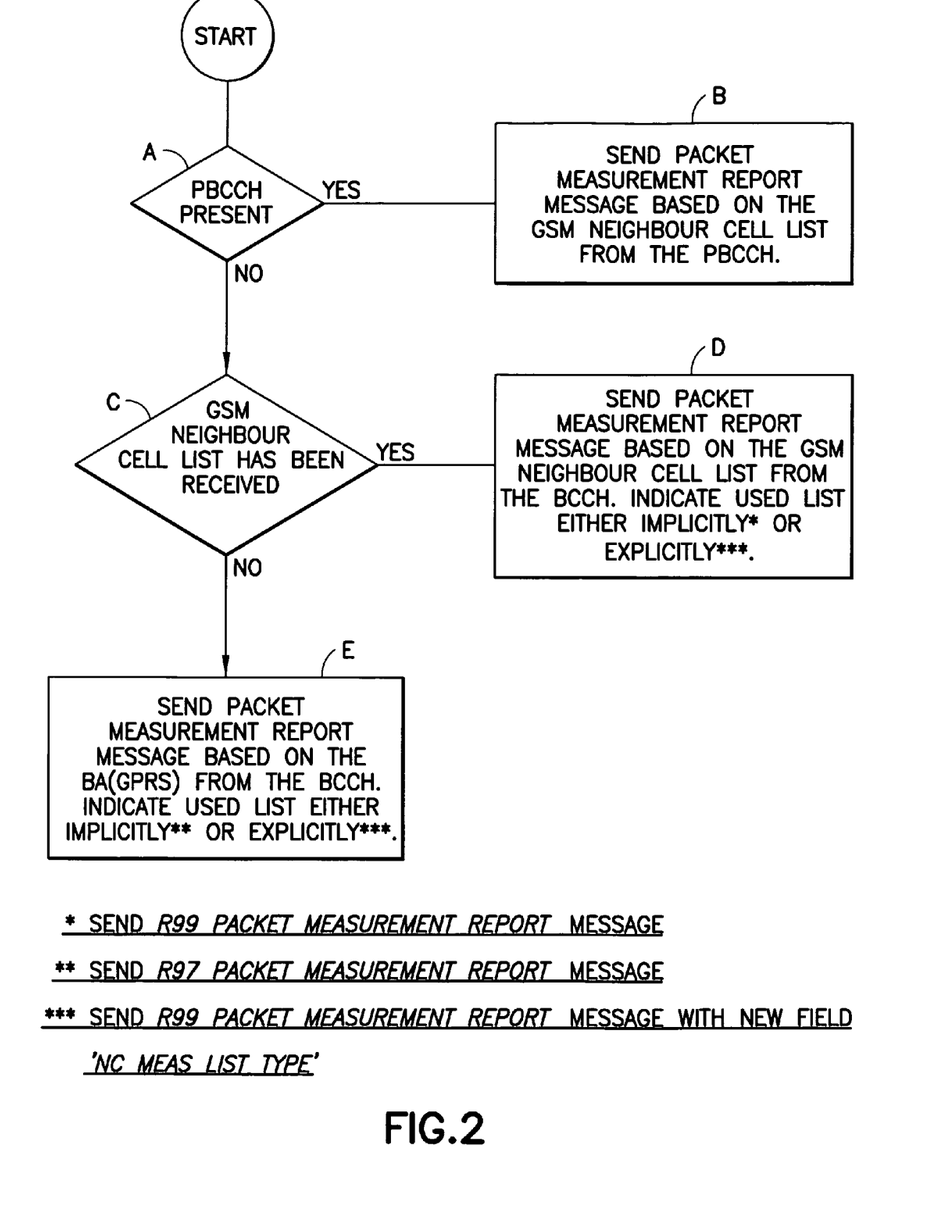
FIG. 2 is a logic flow diagram in accordance with a method of this invention.

Referring to FIG. 2, in accordance with a method of this invention to operate the MS 100 with the network 20, the following processes are executed:

A) in at least one network control mode of operation (preferably NC2), determining in the MS 100 if a cell to which the MS 100 is currently assigned has a first type of broadcast control channel (the PBCCH); and B) if the cell does have the first type of broadcast control channel, sending a PACKET MEASUREMENT REPORT message to the network for reporting on neighbour cells identified in a list received from the PBCCH, specifically the GSM Neighbour Cell list;

C) if the cell does not have the PBCCH, determining in the MS 100 if the GSM Neighbour Cell list has been received;

D) if the GSM Neighbour Cell list has been received, sending a PACKET MEASUREMENT REPORT message to the network for reporting on neighbour cells identified in the GSM Neighbour Cell list received from the BCCH, while indicating the list that was used either implicitly (by sending the R99 PACKET MEASUREMENT REPORT message) or explicitly (by sending the R99 PACKET MEASUREMENT REPORT message with the field NC_MEAS_LIST_TYPE); or E) if the GSM Neighbour Cell list has not been received, sending a PACKET MEASUREMENT REPORT message to the network for reporting on neighbour cells identified in the BA(GPRS) received from the BCCH, while indicating the list that was used either implicitly (by sending the R97 PACKET MEASUREMENT REPORT message) or explicitly (by sending the R99 PACKET MEASUREMENT REPORT message with the field NC_MEAS_LIST_TYPE).

This invention also pertains to a computer program that is stored in some type of computer-readable medium(e.g., the memory 130A of FIG. 1) and that is executed by the MCU 120 of the MS 100 for performing the method, as well as to a computer program that is stored in some type of computer-readable medium and that is executed by a suitable data processor of the network 20 for implementing any network-side component or components of this invention.

The use of this invention is advantageous in that it decreases the time required to begin the measurement reporting on the CCCH. In practice, it prevents the MS 100, when moving at high speed in an area with small cell sizes, from dropping out of service when operating in the NC2 mode.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the use of other similar or equivalent message formats, bit definitions, information element and field definitions and formats, as well changes to the specific names for various messages, fields, channels and the like may be attempted by those skilled in the art. However, all such and similar modifications of the teachings of this invention will still fall within the scope of this invention.

Further, while described above primarily in the context of the NC2 mode of operation, it should be appreciated that this invention can also be employed by a MS 100 operating in the NC1 mode. However, in the NC1 mode the MS 100 should not normally drop out of service, since the MS 100 is permitted to autonomously perform CRS. That is, the MS 100 is enabled to change cells without a command from the network 20, thus a late start to the measurement reporting operation does not in and of itself set a restriction on the change of cells.

Further still, some of the features of the present invention could be used to advantage without the corresponding use of other features. As such, the foregoing description should be considered as merely illustrative of the principles of the present invention, and not in limitation thereof.

What is claimed is:

1. A method comprising:
   in at least one network control mode of operation, determining in a mobile station if a cell to which the mobile station is currently assigned has a first type of broadcast control channel; and
   if the cell does have the first type of broadcast control channel, sending a packet measurement report message to a network for reporting on neighbour cells identified in a list received from the first type of broadcast control channel;
   if the cell does not have the first type of broadcast control channel, sending a packet measurement report message to the network for reporting on neighbour cells identified in a list received from a second type of broadcast control channel, where the type of list is one of implicitly specified by the packet measurement report message or is explicitly specified by the packet measurement report message, where the neighbor cell list is implicitly specified by the packet measurement report message by casting the message in a format of an earlier version of the packet measurement report message that by default implies the type of list.

2. A method as in claim 1, where the list is explicitly specified by the packet measurement report message by a field of the packet measurement report message.

3. A method as in claim 2, where the field is a one bit field for specifying that the packet measurement report is based on a broadcast control channel allocation general packet radio service or on a global system for mobile communications neighbour cell list from a broadcast control channel.

4. A method as in claim 3, where the one bit field is added to the packet measurement report message only if the first type of broadcast control channel is not present in the cell.

5. A method as in claim 1, where the first type of broadcast control channel is a packet broadcast control channel, and where the one bit field is added to the packet measurement report message only if the packet broadcast control channel is not present in the cell.

6. A method as in claim 1, comprising a computer program product embodied on a tangible computer-readable medium and having program instructions for causing a computer to execute the method.

7. A computer-readable storage medium containing computer executable instructions for causing a computer of a mobile station to execute a method of operating with a network the method comprising:
   computer instructions, responsive to a mobile station being in a network control mode of operation where it reports cell measurement results to a network, for determining if a cell to which the mobile station is currently assigned has a packet broadcast control channel; and
   computer instructions, responsive to a determination that the cell does have the packet broadcast control channel, for sending a packet measurement report message to the network for reporting on neighbour cells identified in a global system for mobile communications neighbour cell list received from the packet broadcast control channel, and to a determination that the cell does not have the packet broadcast control channel, for sending a packet measurement report message to the network for reporting on neighbour cells first identified in a broadcast control channel allocation general packet radio service, before the mobile station has acquired the global system for mobile communications neighbour cell list from a broadcast control channel, and after the mobile station has acquired the global system for mobile communications neighbour cell list from the broadcast control channel, the neighbor cells identified in the global system for mobile communications neighbour cell list, where the type of neighbor cell list in use by the mobile station is implicitly specified by the packet measurement report message.

8. A computer-readable storage medium as in claim 7, where the list is implicitly specified by the packet measurement report message by sending the message in a format compatible with an earlier version of the packet measurement report message that by default implies the use of the broadcast control channel allocation general packet radio service.

9. A computer-readable storage medium as in claim 7, where the list is implicitly specified by the packet measurement report message by the mobile station's sending the message to not include a release 99 extension.

10. A computer-readable storage medium containing computer executable instructions for causing a computer of a mobile station to execute a method of operating with a network the method comprising:

computer instructions, responsive to a mobile station being in a network control mode of operation where it reports cell measurement results to the network, for determining if a cell to which the mobile station is currently assigned has a packet broadcast control channel; and computer instructions, responsive to a determination that the cell does have the packet broadcast control channel, for sending a packet measurement report message to a network for reporting on neighbour cells identified in a global system for mobile communications neighbour cell list received from the packet broadcast control channel, and to a determination that the cell does not have the packet broadcast control channel, for sending a packet measurement report message to the network for reporting on neighbour cells identified in the neighbor cell list that is specified explicitly in the packet measurement report message, where the list is explicitly specified by the packet measurement report message by a field of the packet measurement report message, where the field is a one bit field for specifying that the packet measurement report is based on a broadcast control channel allocation general packet radio service or on a global system for mobile communications neighbour cell list received from a broadcast control channel, where the one bit field is added to the packet measurement report message only if the packet broadcast control channel is not present in the cell.

11. An apparatus comprising:
a radio frequency transceiver; and
a controller that operates in at least one network control mode of operation to determine if a cell to which the apparatus is currently assigned has a packet broadcast control channel and, if the cell does have the packet broadcast control channel, operates further to send a packet measurement report message to a network for reporting on neighbour cells identified in a global system for mobile communications neighbour cell list received from the packet broadcast control channel; said controller being responsive to a condition where the cell does not have the packet broadcast control channel to determine if the global system for mobile communications neighbour cell list has been received through the transceiver from a broadcast control channel and, if it has, to send a packet measurement report message to the network for reporting on neighbour cells identified in the global system for mobile communications neighbour cell list received from the broadcast control channel, while indicating the list that was used either implicitly or explicitly; or if the global system for mobile communications neighbour cell list has not been received, said controller sends a packet measurement report message to the network for reporting on neighbour cells identified in a broadcast control channel allocation general packet radio service received from the broadcast control channel, while indicating the neighbor cell list that was used either implicitly or explicitly, where, when implicitly specified, the neighbor cell list is implicitly specified by the packet measurement report message by casting the message in a format of an earlier version of the packet measurement report message that by default implies the type of list.

12. An apparatus as in claim 11, where the network control mode is NC2.

13. An apparatus as in claim 11, where the network control mode is NC1.

14. An apparatus as in claim 11, where the list is explicitly signaled by the state of a NC_MEAS_LIST_TYPE bit in the packet measurement report message.

15. A method comprising:
in at least one network control mode of operation, determining in a mobile station if a cell to which the mobile station is currently assigned has a first type of broadcast control channel; and
if the cell does have the first type of broadcast control channel, sending a packet measurement report message to a network for reporting on neighbour cells identified in a list received from the first type of broadcast control channel;
if the cell does not have the first type of broadcast control channel, sending a packet measurement report message to the network for reporting on neighbour cells identified in a list received from a second type of broadcast control channel, where the type of neighbor cell list is implicitly specified by the packet measurement report message.

16. A method as in claim 15, where the list is implicitly specified by the packet measurement report message by casting the message in a format of an earlier version of the packet measurement report message that by default implies the type of list.

17. A method as in claim 15, where the first type of broadcast control channel is a packet broadcast control channel, and where a one bit field is added to the packet measurement report message only if the packet broadcast control channel is not present in the cell.

18. A method as in claim 15, comprising a computer program product embodied on a tangible computer-readable medium and having program instructions for causing a computer to execute the method.

19. A method comprising:
determining if a cell to which a mobile station is currently assigned has a packet broadcast control channel and, if the cell does have the packet broadcast control channel, sending a packet measurement report message to a network for reporting on neighbour cells identified in a global system for mobile communications neighbour cell list received from the packet broadcast control channel;

while if the cell does not have the packet broadcast control channel, determining if the global system for mobile communications neighbour cell list has been received through the transceiver from a broadcast control channel and, if it has, sending a packet measurement report message to the network for reporting on neighbour cells identified in the global system for mobile communications neighbour cell list received from the broadcast control channel; while if the global system for mobile communications neighbour cell list has not yet been completely received through the transceiver from the broadcast control channel, sending a packet measurement report message to the network for reporting on neighbour cells identified in a broadcast control channel allocation general packet radio system received from the broadcast control channel, where the neighbor cell list associated with the general packet radio service is implicitly specified.

20. A computer-readable storage medium containing computer executable instructions for causing a computer of a mobile station to execute a method of operating with a network the method comprising:
    determining if a cell to which a mobile station is currently assigned has a packet broadcast control channel and, if the cell does have the packet broadcast control channel, generating a packet measurement report message using a global system for mobile communications neighbour cell list received from the packet broadcast control channel;
    if the cell does not have the packet broadcast control channel, determining if the global system for mobile communications neighbour cell list has been acquired from a broadcast control channel and, if it has, using the acquired global system for mobile communications neighbour cell list for generating the packet measurement report message; while if the global system for mobile communications neighbour cell list has not been acquired from the broadcast control channel, using a broadcast control channel allocation general packet radio system received from the broadcast control channel for generating the packet measurement report message, where the neighbor cell list associated with the general packet radio service is implicitly specified.

21. An apparatus as in claim 11, wherein the apparatus is a mobile station.

22. A method comprising:
    determining if a first type of broadcast control channel is present;
    if it is determined that the first type of broadcast control channel is present, then sending a measurement report message based on a neighbor list associated with a first type of service;
    if it is determined that the first type of broadcast control channel is not present, then determining if the neighbor list associated with the first type of service has been received;
    if it determined that the neighbor list associated with the first type of service has been received, then sending the measurement report message based on the neighbor list associated with the first type of service; and
    otherwise, sending the measurement report message based on a neighbor list associated with a second type of service, where the neighbor cell list associated with the second type of service is one of implicitly specified by the measurement report message or explicitly specified by the measurement report message, where, when implicitly specified, the neighbor cell list is implicitly specified by the packet measurement report message by casting the message in a format of an earlier version of the packet measurement report message that by default implies the type of list.

23. An apparatus comprising:
    a controller configured to operate in at least one network control mode of operation to determine if a cell to which the apparatus is currently assigned has a packet broadcast control channel and, if the cell is determined by the controller to have the packet broadcast control channel, the controller is configured to send a packet measurement report message to a network for reporting on neighbour cells identified in a global system for mobile communications neighbour cell list received from the packet broadcast control channel; said controller being responsive to a condition where the cell is determined not to have the packet broadcast control channel by determining if the global system for mobile communications neighbour cell list has been received through the radio frequency transceiver from a broadcast control channel and, if the global system for mobile communications neighbour cell list has been determined to have been received, the controller is configured to send a packet measurement report message to the network for reporting on neighbour cells identified in the global system for mobile communications neighbour cell list received from the broadcast control channel; while if the global system for mobile communications neighbour cell list has not been received, said controller is configured to send a packet measurement report message to the network for reporting on neighbour cells identified in a broadcast control channel allocation general packet radio service received from the broadcast control channel, where the neighbor cell list associated with the general packet radio service is implicitly specified.

24. An apparatus as in claim 23, said controller is configured to send the packet measurement report message to the network for reporting on the neighbour cells identified in the broadcast control channel allocation general packet radio service received from the broadcast control channel while indicating the list that was used either implicitly or explicitly.

25. An apparatus as in claim 23, the controller being configured to retrieve and store computer program instructions in a memory, wherein the computer program instructions, when executed by the controller, perform the controller operations of determining if the cell has a packet broadcast control channel and sending the packet measurement report message.

26. An apparatus as in claim 23, the controller being configured to re-read and rebuild a global system for mobile communications neighbour cell list for a cell without a packet broadcast control channel if a broadcast control channel allocation indication parameter is changed.

27. An apparatus as in claim 23, the controller being configured to interface with a wireless section for wireless communications.

28. An apparatus as in claim 27, the wireless section comprising a radio frequency transceiver.

29. An apparatus comprising:
    a controller configured to operate in at least one network control mode of operation to determine if a first type of broadcast control channel is present; the controller configured to send a measurement report message based on a neighbor list associated with a first type of service if it is determined that the first type of broadcast control channel is present; the controller configured to determine if the neighbor list associated with the first type of service has been received if it is determined that the first type of broadcast control channel is not present; the controller being configured to send the measurement report message based on the neighbor list associated with the first type of service if it determined that the neighbor list associated with the first type of service has been received and otherwise being configured to send the measurement report message based on a neighbor list associated with a second type of service, where the neighbor cell list associated with the second type of service is implicitly specified.

30. An apparatus as in claim 29, where the neighbor list is implicitly specified by the measurement report message by casting the message in a format of an earlier version of the measurement report message that by default implies a type of neighbor list.

31. An apparatus as in claim 29, where the list is explicitly specified by the measurement report message by a field of the measurement report message.

32. An apparatus as in claim 31, where the field is a one bit field for specifying that the measurement report is based on a broadcast control channel allocation general packet radio service or on a global system for mobile communications neighbor cell list received from a broadcast control channel.

* * * * *